Aug. 20, 1968    E. GRÜNWALD    3,398,385
MAGNET STRUCTURE WITH AN AIR GAP OF VARIABLE WIDTH
Filed Jan. 22, 1965    3 Sheets-Sheet 1

United States Patent Office 3,398,385
Patented Aug. 20, 1968

3,398,385
MAGNET STRUCTURE WITH AN AIR GAP OF VARIABLE WIDTH
Erich Grünwald, Erlangen, Germany, assignor to Siemens Aktiengesellschaft, Berlin-Siemensstadt, Germany
Filed Jan. 22, 1965, Ser. No. 427,333
Claims priority, application Germany, Jan. 22, 1964,
S 89,166, S 89,167
10 Claims. (Cl. 335—210)

ABSTRACT OF THE DISCLOSURE

Magnet structure includes a pair of pole shoes spaced from each other by an elongated air gap of varying width, each of the pole shoes including a plurality of blocks at least partly spaced from each other in the longitudinal direction of the air gap and being spaced successively increasing distances from the longitudinal axis of the air gap, the spacing between successive blocks corresponding approximately to the increase in the distance of the blocks respectively from the longitudinal axis of the air gap, and excitation winding means cooperating with the pole shoes so as to provide uniform magnetic induction along substantially the entire length of the air gap.

---

My invention relates to magnet structures with pole shoes between which an air gap of given shape and varying width is formed. The magnetic field in such air gaps tends to be crowded in the localities of the smallest gap width which, for some purposes, is a fundamental disadvantage, such as for example in the operation of magnetohydrodynamic (MHD) converters having funnel-shaped channels.

When an ionized gas (plasma) of high flow velocity is passed through the channel of an MHD converter, electrical energy can be taken from electrodes mounted perpendicularly to the flow direction of the plasma and to a magnetic field located within the channel and extending between the pole shoes of a magnet. The MHD converter then operates as an electric generator. If a higher terminal voltage is impressed upon the electrodes, the MHD converter operates as a motor, that is with the effect of a pump.

When in an MHD generator the values essential for the energy conversion are kept constant as to time, the output of the generator is a direct current. If one of these values is periodically varied, the external load circuit connected between the electrodes is thus supplied with alternating current.

It can be shown that funnel-shaped channels are theoretically necessary for useful conversion of the plasma energy content which is dependent upon temperature, flow velocity and pressure. These funnel-shaped channels may be formed with a rectangular cross section and the lateral channel walls may be arcuate in accordance with suitably calculated curves.

In practice, however, such funnel-shaped channels have not been employed because of the difficulties encountered when applying a transverse magnetic field. For that reason, the energy content of the plasma has heretofore been utilizable only to a very limited extent. The problem resulting from the crowding of the magnetic field is critical because, on the one hand, the funnel-shaped channel cannot be located between magnet poles with mutually parallel pole shoe faces because the losses then encountered in the production of the magnetic field would be too high and, on the other hand, the requirement must be satisfied that the magnetic field be largely homogeneous along the channel axis in order to maintain, relative to the volume, a high specific power output and thus a good efficiency up to the end of the channel.

It is accordingly an object of my invention to prevent crowding of the magnetic field in air gaps of varying width in MHD devices, and a more specific object of my invention is to provide a solution for the problem just mentioned.

According to the invention, I provide a magnet structure having an air gap of spacially variable width, with pole shoes formed of blocks which are displaced from each other relative to the longitudinal direction of the air gap a distance which at least approximately corresponds to the half of increased spacing or offset distance between the blocks in a direction transverse to the longitudinal axis of the gap.

As a result, the magnetic field is guided in pole shoes and air gap, and a crowding of the magnetic field is prevented. This also affords supplying a stronger magnetic field to the air gap without causing saturation at localities of small air gap width.

The described effect results from the fact that the magnetic resistance between the blocks of a pole shoe increases to the same extent as the resistance through one-half the width of the air gap.

The pole-shoe blocks readily permit attaining or approximating the desired shape and width of the air gap, for example as required for the funnel-shaped channel of an MHD generator.

In accordance with another feature of my invention, a homogeneous magnetic field of constant strength may be produced in the air gap by means of excitation windings accommodated in the gaps between the blocks of the pole shoes in such a manner that the blocks are inductively coupled with more excitation turns at the localities of larger air gap width than the blocks situated at localities of smaller gap width.

According to still another feature of my invention, the pole shoes are subdivided by grooves into segments transverse to the longitudinal direction of the air gap, up to a zone or segment portion having a continuous closed surface at the air gap. The grooves serve for accommodating the excitation windings; and the segments form layers in two mutually perpendicular layer planes which are oriented perpendicularly to the longitudinal direction in a region of larger air gap width for each segment, the corresponding groove being located adjacent a region of smaller air gap width for the respective segment. This also has the effect of guiding the magnetic field in the pole shoes and air gap so as to prevent crowding of the magnetic field; and by virtue of the same features, it is also possible to supply to the air gap a stronger magnetic field without causing saturation of the magnetically conducting material at localities of the smaller air gap width.

Other features which are considered as characteristic for the invention are set forth in the appended claims.

Although the invention is illustrated and described herein as embodied in magnet structure with an air gap of variable width, it is nevertheless not intended to be limited to the details shown, since various modifications and structural changes may be made therein without departing from the spirit of the invention and within the scope and range of equivalents of the claims.

The construction and method of operation of the invention, together with additional objects and advantages thereof will be best understood from the following description of specific embodiments when read in connection with the accompanying drawings in which.

Figure 1:
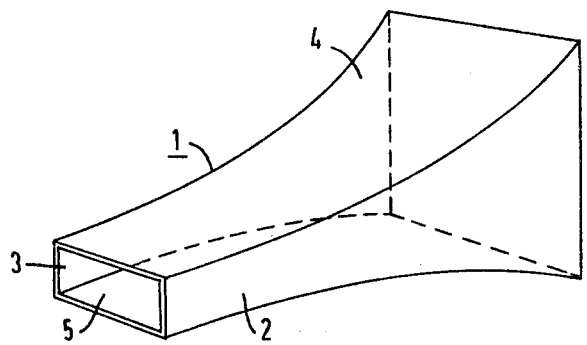
FIG. 1 shows schematically and in perspective a funnel-shaped channel for an MHD converter which is to be considered as being mounted in the air gap of a magnet.

Referring now to the drawings, and first particularly to FIG. 1, there is shown a funnel-shaped channel for an MHD converter formed of walls 2, 3, 4 and 5. Electrodes (not shown) are mounted flush on walls 2 and 3 in the interior of the channel so as to lie opposite each other. The shape of the walls 4 and 5 determines the shape and width of the air gap between pole shoes which, in the assembled condition of the converter, are closely adjacent to these respective walls.

Figure 2:
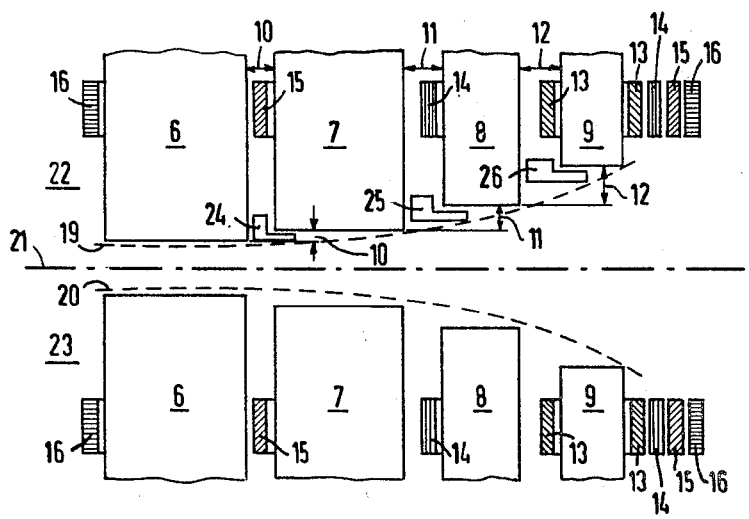
FIG. 2 shows schematically a longitudinal section through two pole shoes of a magnet system according to the invention for field excitation of an air gap suitable for accommodating a channel as shown in FIG. 1.

The pole shoes 22 and 23 shown in FIG. 2 represent two embodiments of pole shoes of a magnet structure according to the invention. It should be understood that either the upper or the lower pole shoe is to be provided twice so that the two equally designed pole shoes form jointly a mirror-symmetrical arrangement relative to a plane extending perpendicularly to the plane of illustration through the longitudinal axis 21 of the air gap. The minimum width of the air gap required for a given channel is indicated by the lines 19 and 20. Each pole shoe 22, 23 is composed of rectangular blocks 6, 7, 8 and 9 of magnetically conducting material which are spaced from each other in the longitudinal direction of the air gap a distance 10, 11, 12 which is in the order of magnitude of the increase in width of the distance between the respective blocks and the air gap axis 21. That is, as viewed in FIG. 2, the horizontal spacing 10 is equal to the vertical spacing 10, the horizontal spacing 11 is equal to the vertical spacing 11, and the horizontal spring 12 is equal to the vertical spacing 12, for example.

The magnetic field is excited by the sectionally illustrated excitation windings 13, 14, 15 and 16. The turns of the excitation windings are accommodated in the interspaces measured by the distances 10, 11, 12 between the respective pole-shoe blocks.

The pole-shoe blocks at localities of larger air gap width are surrounded by more turns of the excitation windings than the blocks at localities of smaller air gap width. Thus, the blocks 9 are surrounded by and inductively coupled with all four excitation windings 13, 14, 15 and 16, whereas, for example, the blocks 8 are only surrounded by the windings 14, 15 and 16. Consequently, the ampere winding turns in blocks 6 to 9 increase stepwise. Although the magnetic field path across the air gap increases in length from blocks 6 to blocks 9, a substantially uniform induction is thus obtained along the length of the gap. For preventing appreciable crowding of the magnetic field at the localities of smaller air gap width, it is essential that the magnetic resistance between mutually adjacent pole-shoe blocks increase to the same extent as the resistance caused by the increase in width of the air gap between the block surface facing the air gap and the channel axis 21 or the plane passing through this axis. For example, the resistance of a path sequentially through the blocks 8, 7, 7 and 8 must be just as great as the resistance of a path directly between the blocks 8 and 8.

It will be understood that the contour of the required air gap width may be more closely approximated by employing more than the illustrated four blocks for each pole shoe or may also be formed by fewer than four blocks.

Magnetically conducting equalizing pieces 24, 25, 26 serve to equalize the field at the air gap between the pole-shoe blocks. When rectangular blocks are provided, the equalizing pieces may have a substantially trapezoidal cross section, as illustrated. In the embodiment shown, these equalyizing pieces partly deflect the adjacent block at the right so that the field passes over the equalizing pieces. With suitable dimensioning, greater uniformity of field distribution and adaptation of the fields of adjacent blocks respectively are achieved.

Figure 3:
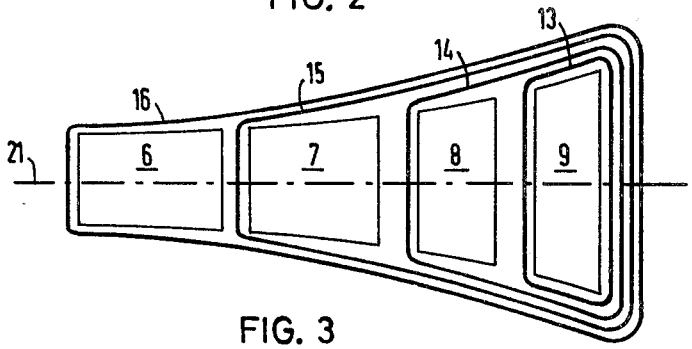
FIG. 3 shows schematically a top view of the lower pole shoe 23 according to FIG. 2.

The aforedescribed arrangement of the excitation windings is more fully apparent from FIG. 3, showing schematically a plan view of the lower pole shoe 23 according to FIG. 2.

Figure 4:
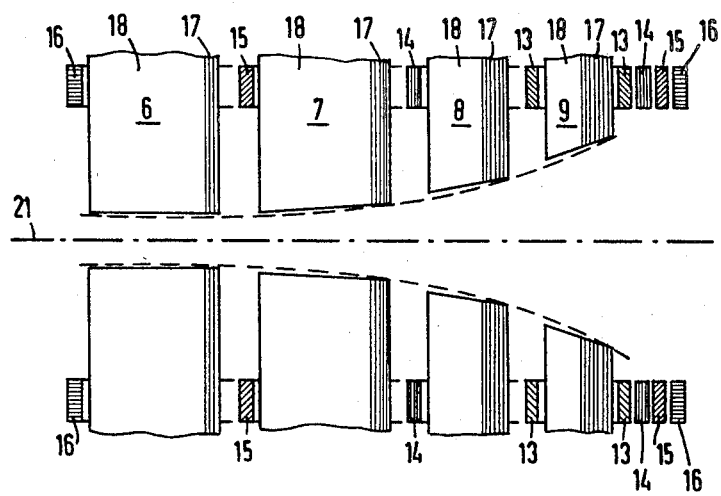
FIG. 4 shows schematically a design of pole shoes for field excitation, the shoe being composed of transformer sheet-metal laminations arranged in two layer directions.
Figure 5:
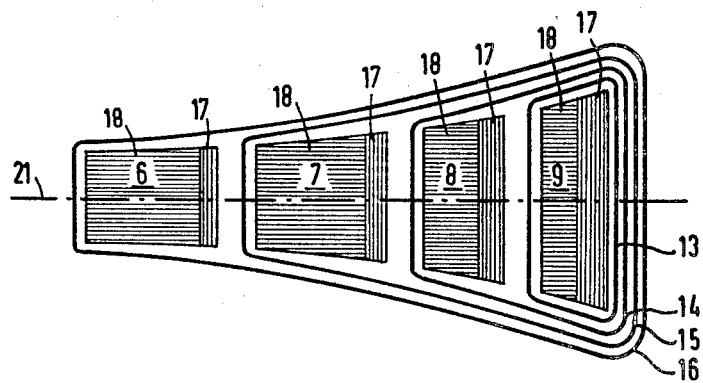
FIG. 5 is a schematic top view of one of the pole shoes according to FIG. 4.

FIG. 4 is a lateral elevational view of a longitudinal section through different pole shoes in a magnet system for obtaining a field distribution similar in type to that described with reference to FIG. 2. The top plan view shown in FIG. 5 is as seen from the air gap toward the lower pole shoe of FIG. 4. The blocks 6, 7, 8 and 9 of the pole shoes are composed of transformer sheet laminations. At the localities of relatively large air gap width, the lamination plane in each block is oriented perpendicularly to the longitudinal axis 21 of the air gap. This region of the laminations is denoted by 17. Immediately adjacent is a one-piece solid portion of the block (FIG. 4) or, if excitation is by alternating current, a layer 18 of vertically laminated sheets disposed perpendicularly to the laminations 17 can be used. The layer directions of the laminations are indicated schematically in FIGS. 4 and 5. The lines in the regions denoted by 17 and 18 may be considered as representing the edges of the laminations.

Due to the hereinabove described use of vertical layer planes in the regions 17, a stronger field guidance is obtained in these regions because electrically insulating coatings of the transformer sheets approximately constitute air resistances with respect to the magnetic field. In the regions 18, however, a field deflection in the plane through the longitudinal axis of the air gap is possible. The field distribution can be controlled by providing suitable inclination of the block surfaces toward the air gap, or by providing equalizing pieces as shown at 24, 25, 26 in FIG. 2, which can also be connected with the blocks.

Figure 6:
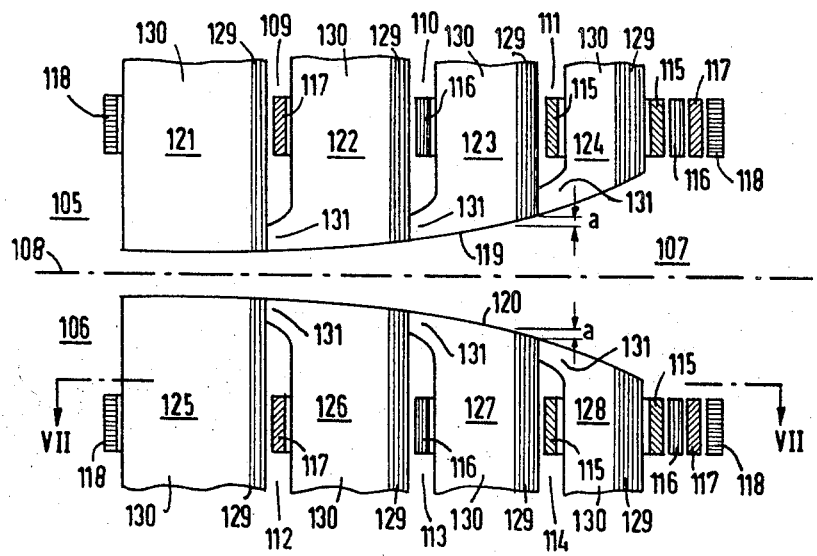
FIG. 6 shows a longitudfinal section through two pole shoes of another embodiment of a magnet system according to the invention, which is also suitable for a channel occording to FIG. 1.

According to the embodiment of FIG. 6, the pole shoes 105 and 106 form between each other an air gap 107 symmetrical to a longitudinal plane 108. The pole shoes 105 and 106 are subdivided into segments by grooves 109, 110, 111 and 112, 113, 114. The shape of the grooves is such as to permit accommodating the excitation windings 115, 116, 117 and 118 in the grooves, while zones or portions of the segments having a continuous closed surface 119 and 120 at the air gap will remain. The segments 121 to 124 and 125 to 128 consist of transformer sheet metal. The sheet metal laminations extend in two mutually perpendicular planes. Thus, each segment has two regions 129 and 130 which are so illustrated that the indicated lines represent the edges of the laminations.

Figure 7:
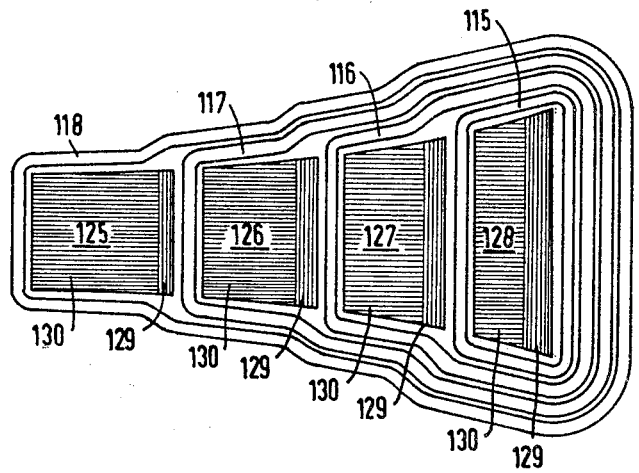
FIG. 7 shows a section along the line VII—VII in FIG. 6 through one of the pole shoes.

The orientation of the laminations is also apparent from FIG. 7. The excitation windings 115 to 118 are arranged in the grooves in such a manner that the segments located at the larger air gap widths are surrounded by more excitation windings than the segments located at smaller air gap widths. Thus, the ampere winding turns increase in the direction of the increase stepwise in gap width from segment to segment. The greatest ampere turns are thus assigned to the largest gap width.

Crowding of the magnetic field at the locality of relatively small gap widths is prevented by guidance of the magnetic flux in the lamination regions 129. This is aided by providing suitably selected saturation for the pole-shoe nose portions 131. The electrical insulating coating on the individual laminations acts approximately as an air resistance with respect to the magnetic flux. This results in the desired guidance of the magnetic flux within the lamination regions 129. Furthermore, the passage of the magnetic flux from the regions 130, in which it is substantially free to pass through the axis of the plane 108, into the adjacent segments, is prevented, since the magnetic resistance through the region 129 and the pole-shoe noses 131 possesses a required minimum value. This minimum value is provided in each segment by forming the region 129 and the cross section of the pole-shoe nose 131 of such thickness that the magnetic resistance perpendicular to the layer plane is substantially as large as the resistance produced by widening the air gap width on one side along the layer, this unilateral widening being indicated by *a* relative to segments 123 and 127. The magnetic resistance of the laminations is oriented perpendicular to the longitudinal direction of the air gap, and the magnetic resistance of one pole-shoe nose, therefore, must be at least approximately in the order of magnitude of the resistance resulting from the unilateral widening of the air gap. Under these conditions, flux paths between the segments 124, 123, 127 and 128 may be directly coordinated to paths having the same resistance as obtains between the segments 124 and 128, for example.

The grooves 109 to 114 in which the excitation windings are located, aid in the magnetic separation of mutually adjacent segments. Effective in the same sense are the noses 131 of the regions 130, which also provide the closed surfaces 119 and 120 of the zone adjacent to the air gap, whereby the magnetic flux is also guided beneath the grooves. By utilization of the saturation in the magnetically conducting material, the ampere turns (product of the current in the excitation winding times the number of winding turns) can be so adjusted that no jump in magnetic induction occurs between adjacent segments. In this manner, a virtually completely homogeneous magnetic field is obtainable in the air gap.

To provide for a magnetic return of the flux passing through the air gap between the pole shoes, the magnet structure may be provided with yokes of conventional type arranged on one or both sides, as well as with enlarged block heads that are not interconnected, so that a large air cross section serves for the return flux. The excitation windings may also be mounted laterally of the air gap which affords a great reduction in the stray fields and the corresponding share of flux imposed upon the cross section of the pole shoes.

I claim.

1. Magnet structure comprising a pair of pole shoes spaced from each other by an elongated air gap of varying width, each of said pole shoes including a plurality of blocks at least partly spaced from each other in the longitudinal direction of said air gap and being spaced successively increasing distances from the longitudinal axis of said air gap, the spacing between successive blocks corresponding approximately to the increase in the distance of said blocks respectively from the longitudinal axis of said air gap, and excitation winding means cooperating with said pole shoes so as to provide uniform magnetic induction along substantially the entire length of said air gap.

2. Magnet structure comprising a pair of pole shoes spaced from each other by an elongated air gap of varying width, each of said pole shoes including a plurality of blocks at least partly spaced from each other in the longitudinal direction of said air gap and being spaced successively increasing distances from the longitudinal axis of said air gap, the spacing between successive blocks corresponding approximately to the increase in the distance of said blocks respectively from the longitudinal axis of said air gap, and excitation windings located in the spacing between said blocks and cooperating with said pole shoes so as to provide uniform magnetic induction along substantially the entire length of said air gap.

3. Magnet structure comprising a pair of pole shoes spaced from each other by an elongated air gap of varying width, each of said pole shoes including a plurality of blocks at least partly spaced from each other in the longitudinal direction of said air gap and being spaced successively increasing distances from the longitudinal axis of said air gap, the spacing between successive blocks corresponding approximately to the increase in the distance of said blocks respectively from the longitudinal axis of said air gap, and excitation windings located in the spacing between said blocks and cooperating with said pole shoes so as to provide uniform magnetic induction along substantially the entire length of said air gap, a greater number of said excitation windings surrounding the blocks adjacent wider portions of said air gap than the blocks adjacent narrower portions of said air gap.

4. Magnet structure comprising a pair of pole shoes spaced from each other by an elongated air gap of varying width, each of said pole shoes including a plurality of rectangular blocks spaced from each other in the longitudinal direction of said air gap and being spaced successively increasing distances from the longitudinal axis of said air gap, the spacing between successive blocks corresponding approximately to the increase in the distance of said blocks respectively from the longitudinal axis of said air gap excitation field windings located in the spacing between said blocks, and magnetically conducting equalizing pieces located between said blocks for distributing the field produced by said windings at said gap.

5. Magnet structure according to claim 4, wherein said equalizing pieces have a substantially tapezoidal cross section.

6. Magnet structure comprising a pair of pole shoes spaced from each other by an elongated air gap of varying width, each of said pole shoes including a plurality of blocks at least partly spaced from each other in the longitudinal direction of said air gap and being spaced successively increasing distances from the longitudinal axis of said air gap, the spacing between successive blocks corresponding approximately to the increase in the distance of said blocks respectively from the longitudinal axis of said air gap, each of said blocks being formed of sheet metal laminations having at least one layer located in a plane perpendicular to the longitudinal axis of said air gap and adjacent a wider portion of said air gap than the remainder of said block, and excitation winding means cooperating with said pole shoes so as to provide uniform magnetic induction along substantially the entire length of said air gap.

7. Magnet structure comprising a pair of pole shoes spaced from each other by an elongated air gap of varying width, each of said pole shoes being subdivided by a plurality of grooves into a plurality of segments extending substantially transverely to the longitudinal axis of said air gap, each of said segments having a portion in lateral engagement with an adjacent segment, said segment portions together having a continuous closed surface at said air gap, each of said segments comprising two layers of laminations located in mutually perpendicular planes, the plane in which one of said layers is located being perpendicular to the longitudinal axis of said air gap, said one layer being adjacent a wider portion of said air gap than the other layer of laminations, and the corresponding groove being located at said segment portion adjacent a relatively narrower portion of said air gap, and excitation winding means cooperating with said pole shoes so as to provide uniform magnetic induction along substantially the entire length of said air gap.

8. Magnet structure comprising a pair of pole shoes spaced from each other by an elongated air gap of varying width, each of said pole shoes being subdivided by a plurality of grooves into a plurality of segments extending substantially transverely to the longitudinal axis of said air gap, each of said segments having a portion in lateral engagement with an adjacent segment, said segment portions together having a continuous closed surface at said air gap, each of said segments comprising two layers of laminations located in mutually perpendicular planes, the plane in which one of said layers is located being perpendicular to the longitudinal axis of said air gap, said one layer being adjacent a wider portion of said air gap than the other layer of laminations, the corresponding groove being located at said segment portion adjacent a relatively narrower portion of said air gap, and excitation windings located in said grooves between said segments for providing a magnetic field therethrough, and cooperating with said pole shoes so as to provide uniform magnetic induction along substantially the entire length of said air gap, the magnetic resistance of said one layer of laminations being of the same order of magnitude as that of the magnetic resistance resulting from the increased distance from said one layer of laminations to the longitudinal axis of said air gap.

9. Magnet structure according to claim 7 wherein said segment laminations consist of transformer sheet metal material.

10. Magnet structure according to claim 8 wherein said excitation windings are distributed in said grooves so that the pole shoe segments adjacent the air gap portion of greatest width are surrounded by windings providing the greatest value of ampere turns.

References Cited
UNITED STATES PATENTS 3,024,379  3/1962  Vester _____ 317—200 X
3,183,381  5/1965  Brogan _____ 310—11

BERNARD A. GILHEANY, *Primary Examiner.*

GEORGE HARRIS, JR., *Assistant Examiner.*